(12) United States Patent
Staudt et al.

(10) Patent No.: US 6,363,598 B1
(45) Date of Patent: Apr. 2, 2002

(54) METHOD OF ASSEMBLING PIPE JOINTS

(75) Inventors: John J. Staudt, Friendswood; H. Dean Goodson, Houston; Charles L. Ashby, Pasadena, all of TX (US)

(73) Assignee: Hunting Oilfield Services, In., Houston Tx ( * ) Notice: Subject to any disclaimer, the term of this patent is extended or adjusted under 35 U.S.C. 154(b) by 0 days.

(21) Appl. No.: 09/520,256

(22) Filed: Mar. 7, 2000

(51) Int. Cl.$^7$ .............................................. B23Q 17/01
(52) U.S. Cl. ................ 29/407.1; 29/407.09; 29/407.01; 29/445; 285/93; 285/333
(58) Field of Search ......................... 29/407.01, 407.03, 29/407.05, 407.09, 407.1, 445, 456, 557, 27 R, 27 C; 285/93, 333, 334, 350, 390

(56) References Cited

U.S. PATENT DOCUMENTS

| | | | | |
|---|---|---|---|---|
| 4,127,927 A | * | 12/1978 | Haulk et al. ................... | 285/93 |
| 4,614,120 A | | 9/1986 | Fradin et al. .................. | 73/761 |
| 4,962,579 A | | 10/1990 | Moyer et al. .................. | 29/407 |
| 5,212,885 A | | 5/1993 | Buonodono et al. ..... | 29/890.14 |
| 5,233,742 A | | 8/1993 | Gray et al. .................... | 29/407 |
| 5,307,549 A | * | 5/1994 | Tsutsumi et al. ........... | 29/27 C |
| 5,661,888 A | | 9/1997 | Hanslik .................... | 29/407.02 |
| 5,689,871 A | | 11/1997 | Carstensenl ................ | 29/401.1 |

* cited by examiner

*Primary Examiner*—S. Thomas Hughes
*Assistant Examiner*—Jermie E. Cozart
(74) *Attorney, Agent, or Firm*—Bracewell & Patterson, LLP (57) ABSTRACT

A method of assembling pipe joints in a pipe string allows the circumferential orientation of a first pipe in the pipe string to be determined relative to a second pipe in the pipe string. Each pipe joint has a coupling member and at least one pin member, the pin member being threadingly connected to the coupling member to create the pipe joint. Threads are created for the pin member and the coupling member of each joint, and each pin member and coupling member is marked with an alignment mark. The threads for each pin member are created so that they are identical to the threads on the other pin members in the pipe string. This is done by gaging the overall rotational capacity of each pin member with a coupling marking gage and adjusting a thread depth as needed. The threads for each coupling member are created so that they are identical to the threads on other coupling members in the pipe string. This is done by gaging the overall rotational capacity of each coupling member with a pin marking gage and adjusting a shoulder stop depth as needed. After threading the pin members and the coupling members, the joints are assembled, and the alignment mark for each pin member and each coupling member is aligned with the alignment mark on each of the other pin and coupling members in the pipe string.

15 Claims, 4 Drawing Sheets

METHOD OF ASSEMBLING PIPE JOINTS

BACKGROUND OF THE INVENTION

1. Field of the Invention

This invention relates in general to pipe joints and in particular to a method for assembling pipe joints so that the down-hole circumferential orientation of a pipe in a pipe string can be determined by the orientation of any other pipe in the same pipe string.

2. Description of Related Art

In a pipe string having a series of joints, each joint having a pin member threadingly connected to a coupling member, it is often desirable to know the circumferential orientation of one pipe in the pipe string relative to another pipe in the string. One method of accomplishing this result is to control the threading process of each pin member and each coupling member so that the relative orientation of one pipe to another is known when any pin member is connected to any coupling member. The circumferential orientation of one pipe relative to another is demonstrated by an alignment mark placed on each pin member and coupling member during the threading process.

U.S. Pat. No. 4,962,579 teaches a method for visually determining on the rig floor if a joint is properly made up with the right amount of torque. A registry mark is placed on the exterior of the first pipe section for proper axial engagement of the pin member with the coupling or box member. The position is determined by finite element analysis.

U.S. Pat. No. 5,212,885 shows a method for achieving proper sealing positioning and proper make up torque of threaded pipe sections. The method is described in column 4, lines 33–44 of the specification. If the face of the box member is properly positioned relative to a triangle mark on the pipe section, make up is terminated. If the face has not reached edge of the triangle mark, torque is increased until either the face progresses into the body of the triangle mark or until maximum torque occurs.

U.S. Pat. No. 4,614,120 shows a method for determining proper make-up torque for pipe joints. A reference mark is set on the male element and on the female element. A grease is applied to the joint and the joint is made up using sufficient torque to cause one element to rotate with the respect to the other element. The joint is torqued until one element reaches a predetermined angle beyond the point where the reference marks are facing each other. This operation is repeated with a determination being made of the range of torques to be applied to the joint with a particular grease being utilized.

U.S. Pat. No. 5,661,888 shows an apparatus for positing two threaded pipes within a target range of relative axial positions. The device supposedly offers advantages over using visual "bench marks" placed on the pin and box members. The device includes a sensor and calibrating device for positioning the sensor a calibrated distance from the end of one of the pipes. A signal generator generates a signal once the sensor head indicates that the relative axial position of the pipes are within the target range desired.

Each of the above references primarily deal with methods for properly torqueing a threaded pipe connection. As such, they do not teach the current method for assembling a series of pipe joints so that the circumferential orientation of one pipe in the pipe string can be determined by reference to another pipe in the string.

A need continues to exist for a simple and economical method for indexing a string of pipe containing a plurality of joints by which the circumferential orientation of one pipe in the pipe string can be determined by reference to another pipe in the string.

A need also exists for such a method which does not require elaborate gaging systems or electronic sensors or sensing systems.

A need also exists for such a method which does not add appreciably to the costs of the pipe threading process, which is simple to implement, and which is reliable in operation.

BRIEF SUMMARY OF THE INVENTION

The method of assembling pipe joints according to the present invention allows the circumferential orientation of a pipe in a pipe string to be determined relative to that of another pipe in the same pipe string. The pipe string is made up of a series of joints, each joint having a coupling member and at least one pin member which are threadingly connected.

Before machining threads on the pin members or the coupling members, a pin marking gage and a coupling marking gage are prepared. The two gages are adapted to threadingly engage each other. A pin gage alignment mark is scribed on the pin marking gage, and a coupling gage alignment mark is scribed on the coupling marking gage. When the pin marking gage and the coupling marking gage are threadingly connected in a first contact position, the pin gage alignment mark and the coupling gage alignment mark are separated by a circumferential offset which represents the amount of rotation remaining to put the gages in a fully engaged position.

A pin alignment mark is placed on each pin member, and a coupling alignment mark is placed on each coupling member. A plurality of threads is machined on an exterior annular surface of the pin member to an initial pin depth. The coupling marking gage is threadingly connected to the pin member, and a circumferential offset between the coupling gage alignment mark and the pin alignment mark is recorded. Based on the circumferential offset, the pin member is again machined, thus altering the initial pin depth of the threads so that the pin alignment mark will align with the coupling gage alignment mark when the gage and the pin member are connected in the first contact position.

A plurality of threads is machined on an interior annular surface of the coupling member to an initial coupling depth. The pin marking gage is threadingly connected to the coupling member, and a circumferential offset between the pin gage alignment mark and the coupling alignment mark is recorded. Based on the circumferential offset, the coupling member is again machined, thus altering the initial coupling depth so that the coupling alignment mark will align with the pin gage alignment mark when the gage and the coupling member are connected in the first contact position.

After machining threads on each pin member and each coupling member according to the preceding method, the pipe string is assembled by connecting each pin member to a coupling member. As each joint is assembled, every pin alignment mark in the pipe string is aligned with all of the other pin alignment marks as well as all of the coupling alignment marks. The alignment of the marks along the pipe string allows determination of the orientation of any pipe in the string by observing the orientation (indicated by the alignment marks) of any other pipe in the string.

Additional objects, features, and advantages will be apparent in the written description which follows.

DETAILED DESCRIPTION OF THE PREFERRED EMBODIMENT

Figure 1:
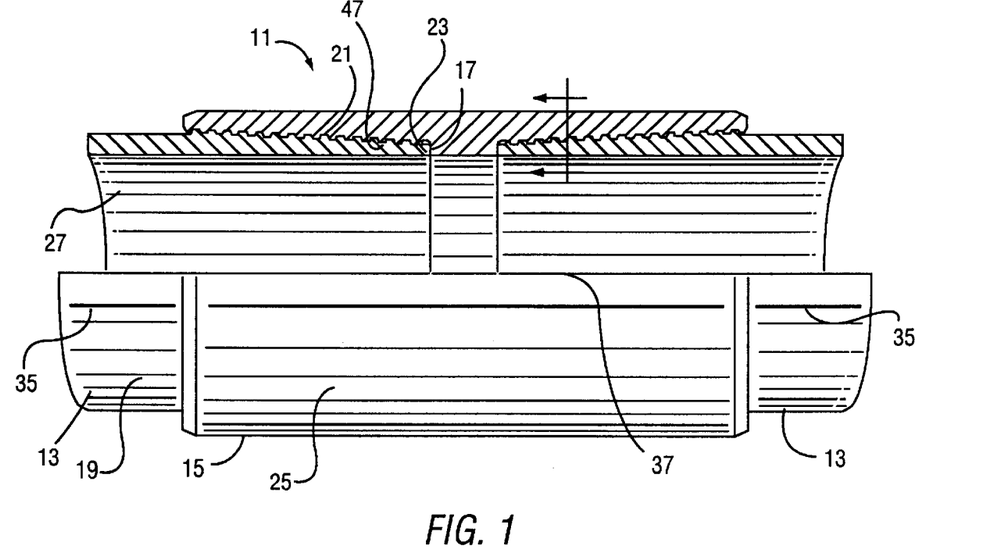
FIG. 1 is a partial cross-sectional view of a pipe joint used with the method of the present invention.
Figure 2:
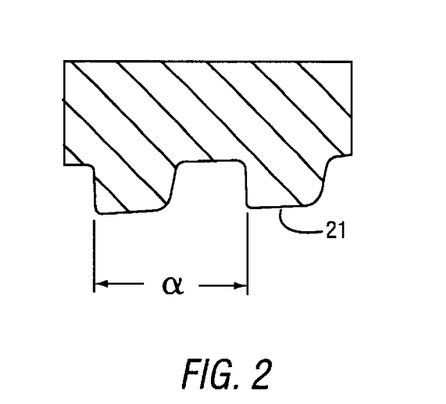
FIG. 2 is a detailed cross-sectional view taken along lines III—III showing the threads of the coupling member of the pipe joint of FIG. 1.

Referring to FIG. 1 in the drawings, a pipe joint 11 used with the method of the present invention is illustrated. Pipe joint 11 is a typical threaded and coupled (TNC) connection having two pipes, or pin members 13 and a coupling member 15. Each pin member 13 includes a front surface 17 and an exterior surface 19 with a plurality of threads 21 formed thereon. Plurality of threads 21 are machined onto exterior surface 19 in a typical tapered arrangement. Threads 21 have a lead distance a as shown in FIG. 2. Coupling member 15 includes an internal shoulder stop 23, an exterior surface 25, and an interior surface 27 with a plurality of threads 29 formed thereon. Threads 29 are also tapered to provide a proper mating arrangement for threads 21 of pin members 13.

Pipe joint 11 is formed by threadingly connecting coupling member 15 to pin members 13. In a fully engaged position (shown in FIG. 1), pin member 13 has been rotated into coupling member 15 with a predetermined torque. The torque that is applied in assembling the joint varies based on the type of material used in the joint, the size of the joint, and the particular application involved. In the fully engaged position, front surface 17 of pin member 13 mates with shoulder stop 23. Shoulder stop 23 provides a positive stopping point for pin members 13 as they are threaded into coupling member 15.

The method according to the present invention is used to circumferentially time the plurality of pipes in a pipe string. The intended result of the method can be seen in FIG. 1. Both pin members 13 have a pin alignment mark 35, 35' scribed on exterior surface 19. Pin alignment marks 35, 35' are preferably scribed parallel to a longitudinal axis which runs along an axial length of pin member 13. A coupling alignment mark 37 is scribed in a similar fashion on exterior surface 25 of coupling 15. By manufacturing pin members 13 and coupling members 15 using the method described herein, all pin alignment marks 35, 35' and all coupling alignment marks 37 in a given pipe string will be circumferentially aligned when each pin and coupling member is in the fully engaged position.

It is important to note that the method of the present invention is not limited to TNC pipe joints such as the one illustrated in FIG. 1. The method can also be used with integral connected joints (not shown). In an integral connected joint, separate coupling members are not used. Instead, each pipe in the pipe string has at one end a pin member and at the other end a coupling member. In other words, the coupling member is integral to each pipe in the pipe string. The circumferential timing method can be used with such an integral connection provided that a positive stop is encountered when threadingly connecting the pin member to the coupling member.

The main portion of the method of the present invention involves machining threads onto a plain end pipe to create pin member 13 (FIG. 1) and machining threads into a coupling blank to create coupling member 15. Therefore, a plain end pipe is a pin member without threads, and a coupling blank is a coupling member without threads. Referring to FIGS. 3–10 in the drawings, the method according to the present invention is illustrated.

Figure 3:
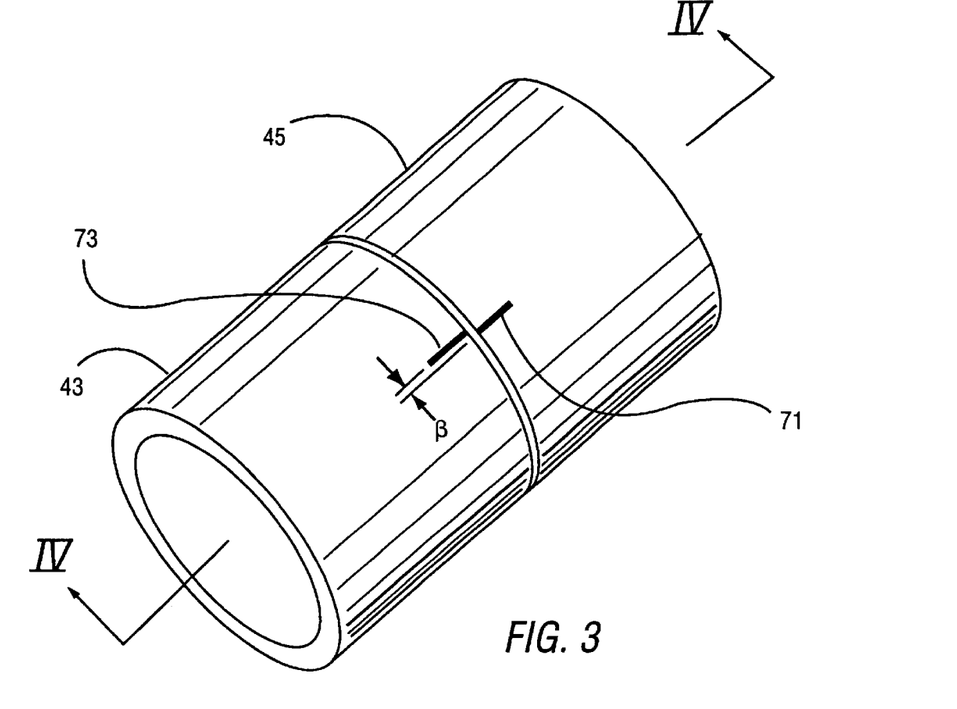
FIG. 3 is a perspective view of a coupling marking gage and a pin marking gage in a first contact position, both gages being used with the method according to the present invention.
Figure 4:
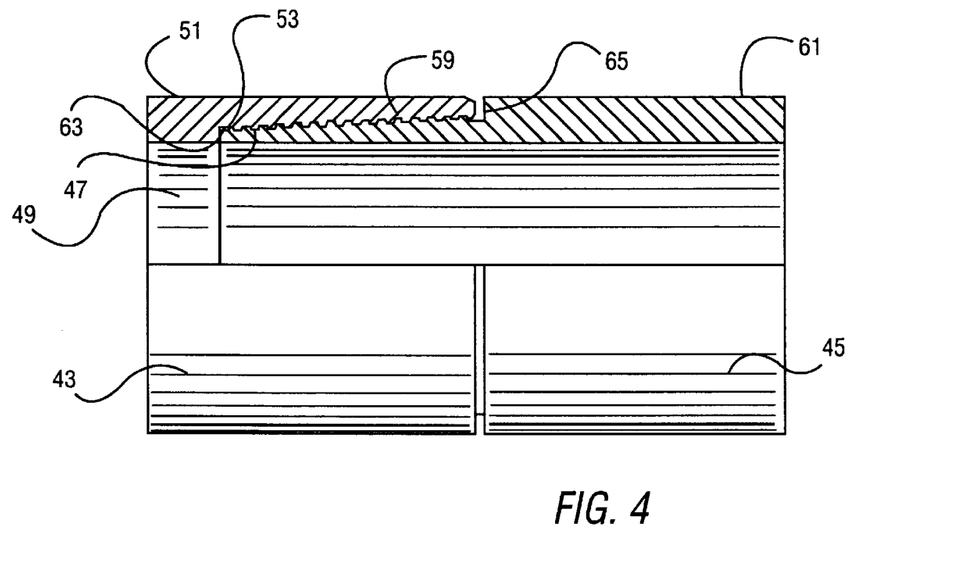
FIG. 4 is a partial cross-sectional side view taken at IV—IV of the gages of FIG. 3.

Before preparing pin member 13 or coupling member 15, a coupling marking gage 43 and a pin marking gage 45 are prepared (see FIGS. 3 and 4). Coupling marking gage 43 is similar to coupling member 15 in that coupling marking gage 43 includes a plurality of tapered threads 47 machined on an inner surface 49 of the gage 43. Coupling marking gage 43 also includes an outer surface 51 and a positive stop shoulder 53. Coupling marking gage 43 is adapted to be threadingly connected to pin member 13 so that positive stop shoulder 53 mates with front surface 17 of pin member 13.

Pin marking gage 45 is similar to pin member 13 in that pin marking gage 45 includes a plurality of tapered threads 59 machined on an outer surface 61. Pin marking gage 45 also includes a positive stop face 63 for mating with positive stop shoulder 53. Pin marking gage 45 is adapted to be threadingly connected to coupling member 15 so that positive stop face 63 mates with shoulder stop 23 of coupling member 15.

Unlike pin member 13, pin marking gage 45 includes a stepped portion 65 which increases the outer diameter of the gage 45 so that outer surface 61 is flush with outer surface 51 of coupling marking gage 43. This feature of pin marking gage 45 is not critical but allows for easier marking and reading of both gages 43, 45.

After preparing gages 43 and 45, pin marking gage 45 is threadingly connected to coupling marking gage 43. The gages 43, 45 are rotatably threaded to each other until reaching a first contact position (shown in FIG. 3). In the first contact position, positive stop face 63 has come into initial contact with positive stop shoulder 53. Although more torque could be applied and the gages 43, 45 subjected to additional rotation, gages 43, 45 are only rotated until positive stop face 63 initially contacts positive stop shoulder 53.

Pin marking gage 45 and coupling marking gage 43, now in the first contact position, are scribed with alignment marks. A pin gage alignment mark 71 is placed on pin marking gage 45. A coupling gage alignment mark 73 is placed on coupling marking gage 43. Marks 71, 73 are separated by a circumferential offset β. Circumferential offset β is determined primarily by the amount of torque required to place the pin member and the coupling member in the fully engaged position. Circumferential offset β can vary depending on the material strength, the diameter, and the thickness of the pipes to be assembled. After scribing marks 71, 73 on gages 45, 43, the two gages 45, 43 are disassembled.

Figure 5:
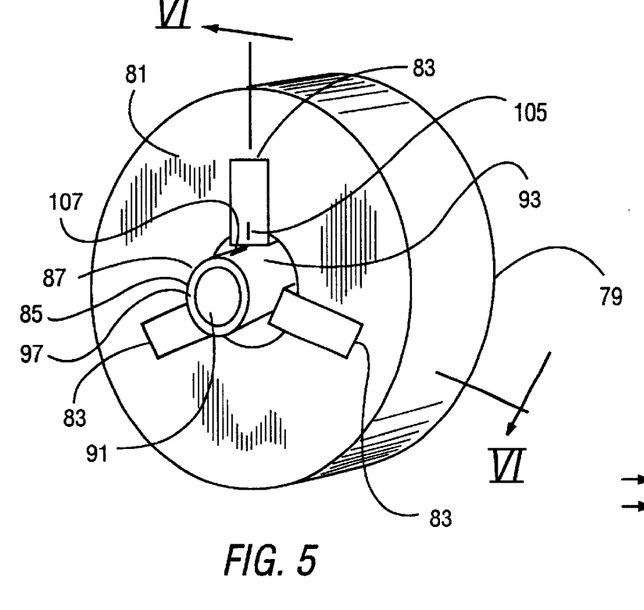
FIG. 5 is a perspective view of a coupling blank being installed in a threading machine according to the method of the present invention.
Figure 6:
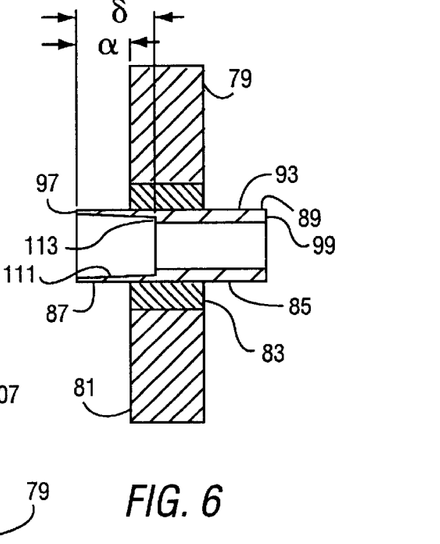
FIG. 6 is a cross-sectional side view taken at VI—VI of the threading machine and the coupling of FIG. 5.
Figure 7:
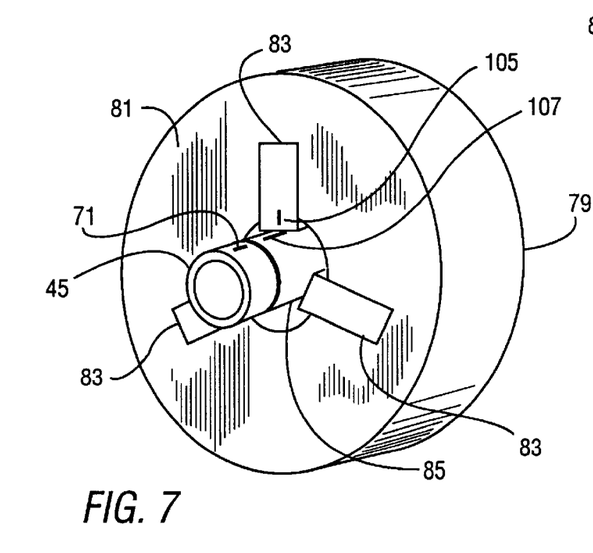
FIG. 7 is a perspective view of the threading machine and coupling of FIG. 5 with the pin marking gage of FIG. 3 installed in the coupling according to the method of the present invention.

Referring more specifically now to FIGS. 5–7 in the drawings, the threading process for coupling member 15 is illustrated. A lathe member 79 having a front surface 81 and a plurality of chucks 83 is used to position and hold a coupling blank 85 during the threading operation. Coupling blank 85 includes a first end 87, a second end 89, an inner surface 91, an outer surface 93, a front face 97, and a rear face 99. Lathe member 79 is one component of a commercially available, computer numerical controlled (CNC) threading machine (not all components shown) used to thread coupling blank 85. A reference alignment mark 105 is placed on any one of chucks 83. A coupling alignment mark 107 (this mark is analogous to coupling alignment mark 37 of coupling member 15 shown in FIG. 1) is placed on outer surface 93 of coupling blank 85.

Coupling blank 85 is installed in lathe member 79 between chucks 83. Chucks 83 hold coupling blank 85 in a fixed position relative to lathe member 79 during the threading process. As coupling blank 85 is installed between chucks 83, coupling alignment mark 107 is aligned with reference alignment mark 105.

After installation of coupling blank 85, a face-off distance γ (shown in FIG. 6) is established by removing a portion of front face 97 of coupling blank 85. Face-off distance γ is the distance between front face 97 and front surface 81 of lathe member 79. During the threading of the first end of the initial coupling blank, face-off distance γ could be a predetermined value that is selected, or it could be an arbitrary value. After a threading operation has been completed on the first end of the first coupling blank, face-off distance γ has been established and is used on all subsequent coupling blanks.

After establishing face-off distance γ, the threading machine is used to bore and profile a tapered surface 111 on inner surface 91 of coupling blank 85. The bore and profiling steps create a shoulder stop 113 at an initial coupling depth δ (shown in FIG. 6). Tapered surface 111 is then threaded. In the preferred embodiment, the threading operation is computer controlled and is carried out by a single point cutting tool (not shown). The cutting tool begins each threading operation from the same radial and arcuate position relative to a given coupling blank, provided that coupling alignment mark 107 is aligned with reference alignment mark 105.

After threading coupling blank 85, pin marking gage 45 is threadingly connected to coupling blank 85. Pin marking gage 45 is rotated into coupling blank 85 until initial contact between positive stop face 63 and shoulder stop 113 of coupling blank 85 (the first contact position). The relative circumferential position of pin gage alignment mark 71 is then compared to coupling alignment mark 107.

The circumferential offset between pin gage alignment mark 71 and coupling alignment mark 107 is recorded and used to calculate how much initial depth δ should be increased in order to make the marks 71, 107 align. The result of this calculation yields a final coupling depth (not shown) to which shoulder stop 113 must be manufactured. The final coupling depth is recorded by the computer-controlled threading machine. The factors that determine the final coupling depth include the diameter of coupling blank 85, thread lead α, and the circumferential distance between pin gage alignment mark 71 and coupling alignment mark 107.

After calculating the final coupling depth, initial coupling depth δ of shoulder stop 113 is increased to the final coupling depth. Pin marking gage 45 is again threadingly connected to coupling blank 85 to observe the relative positions of pin gage alignment mark 71 and coupling alignment mark 107. After increasing the depth of shoulder stop 113 to the final coupling depth, pin gage alignment mark 71 and coupling alignment mark 107 should be aligned.

Since coupling blank 85 needs threads on both first end 87 and second end 89, the process described in the preceding paragraphs is repeated after turning coupling blank 85 around in the chucks 83 so that rear face 99 is where front face 97 was in the preceding operations. Since face-off distance γ and the final coupling depth are known and recorded, the threading operation for second end 89 of coupling blank 85 and for all subsequent couplings now involves fewer steps.

Face-off distance γ is established for second end 89 of coupling blank 85 by machining rear face 99 of blank 85. The value of the face-off distance is the same as that recorded during the threading of first end 87. Second end 89 is then bored and profiled to establish a tapered portion and a shoulder stop (not shown) at the final coupling depth. The tapered portion is then threaded.

Since the threading tool begins the threading process in the same position every time and since the final coupling depth remains the same, the threads machined into second end 89 of coupling blank 85 are timed the same as the threads on first end 87 of coupling blank 85. After manufacturing the second set of threads, coupling blank 85 is considered a coupling member (similar to coupling member 15). The recorded final coupling depth and face-off distance γ can now be used to manufacture subsequent coupling blanks of the same size and material.

Figure 8:
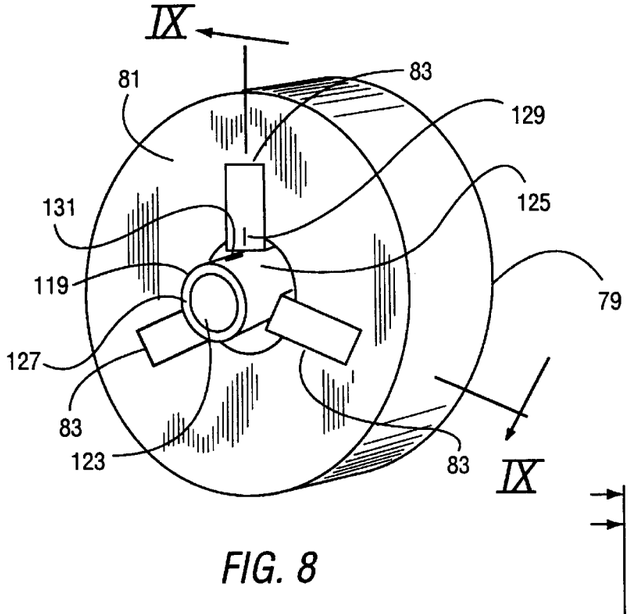
FIG. 8 is a perspective view of a plain end pipe being installed in a threading machine according to the method of the present invention.
Figure 9:
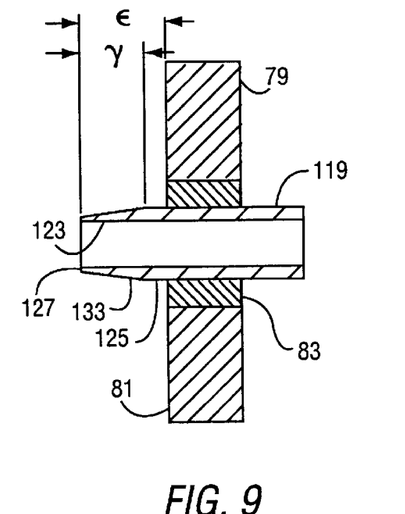
FIG. 9 is a cross-sectional side view taken at IX—IX of the threading machine and the plain end pipe of FIG. 8.
Figure 10:
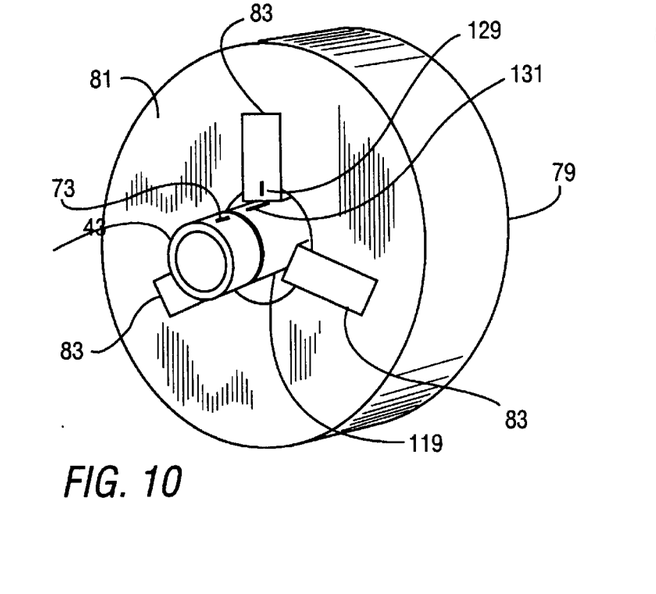
FIG. 10 is a perspective view of the threading machine and plain end pipe of FIG. 8 with the coupling marking gage of FIG. 3 installed on the pin according to the method of the present invention.

Referring specifically to FIGS. 8–10, the process for threading a plain end pipe 119 to create pin member 13 is very similar to the threading process used on coupling blank 85. Lathe member 79 is used to position and hold plain end pipe 119 during the threading operation. Plain end pipe 119 includes a first end and a second end, an inner surface 123, an outer surface 125, a front surface 127, and a rear surface (not shown). A reference alignment mark 129 is placed on any one of chucks 83. Mark 105 used to thread coupling blank 85 can be used as reference alignment mark 129. A pin alignment mark 131 (this mark is analogous to pin alignment mark 35 of pin member 13 shown in FIG. 1) is placed on outer surface 125 of plain end pipe 119.

Plain end pipe 119 is installed in lathe member 79 between chucks 83. Chucks 83 hold plain end pipe 119 in a fixed position relative to lathe member 79 during the threading process. As plain end pipe 119 is installed between chucks 83, pin alignment mark 131 is aligned with reference alignment mark 129.

After installation of plain end pipe 119, a face-off distance ε (shown in FIG. 9) is established by removing a portion of front surface 127 of plain end pipe 119. Face-off distance ε is the distance between front surface 127 and front surface 81 of lathe member 79. For the first plain end pipe that is threaded, face-off distance ε could be a predetermined value that is selected, or it could be an arbitrary value. After a threading operation has been completed on the first end of plain end pipe 119, face-off distance ε is used on all subsequent plain end pipes.

After establishing face-off distance ε, the threading machine is used to profile a tapered portion 133 onto outer surface 125 of plain end pipe 119 to an initial pin depth η. Tapered portion 133 is then threaded. In the preferred embodiment, the threading operation is computer controlled and is carried out by a single point cutting tool (not shown). The cutting tool begins each threading operation from the same radial and arcuate position relative to a given plain end pipe, provided that pin alignment mark 131 is aligned with reference alignment mark 129.

Once threaded, coupling marking gage 43 is threadingly connected to plain end pipe 119. Coupling marking gage 43 is rotated onto plain end pipe 119 until initial contact between positive stop shoulder 53 of coupling marking gage 43 and front surface 127 of plain end pipe 119 (the first contact position). The relative circumferential position of coupling gage alignment mark 73 is then compared to pin alignment mark 131.

The circumferential offset between coupling gage alignment mark 73 and pin alignment mark 131 is recorded and used to calculate how much to decrease initial pin depth η in order to make the marks 73, 131 align. The result of this calculation gives a final pin depth (not shown) to which plain end pipe 119 must be manufactured. The final pin depth is recorded by the computer-controlled threading machine. The factors used to calculate the final pin depth include the diameter of plain end pipe 119, thread lead α, and the circumferential distance between coupling gage alignment mark 73 and pin alignment mark 131.

After calculating the final pin depth, initial pin depth η is decreased to the final pin depth by removing material from front surface 127 of plain end pipe 119. This operation also changes the value of face-off distance ε, the new value of which is recorded. Depending on how much material is removed, the threads (which are tapered) may have to be "reshaped" to a smaller diameter. Following the completion of this operation, coupling marking gage 43 is again threadingly connected to plain end pipe 119 to observe the relative positions of coupling gage alignment mark 73 and pin alignment mark 131. After decreasing the thread depth of plain end pipe 119 to the final pin depth, coupling gage alignment mark 73 and pin alignment mark 119 should be aligned.

Since both ends of plain end pipe 119 must be threaded, the process described in the preceding paragraphs is repeated for the second end of plain end pipe 119. Since the new value of face-off distance ε and the final pin depth are known and recorded, the threading operation for the second end of plain end pipe 119 and for all subsequent pipes now involves fewer steps.

Face-off distance ε, which was previously recorded, is established for the second end of plain end pipe 119 by machining a portion of the rear surface of plain end pipe 119. Plain end pipe 119 is then profiled and threaded to the final pin depth. Since the threading tool begins the threading process in the same position every time and since the final pin depth remains the same, the threads machined onto the second end of plain end pipe 119 are timed the same as the threads on the first end of plain end pipe 119. The recorded face-off distance and final pin depth can now be used to manufacture subsequent plain end pipes of the same size and material.

The use of pin marking gage 45 when threading coupling members and the use of coupling marking gage 43 when threading pin members as described above ensures that the alignment marks 35, 37 will align when pin member 13 and coupling member 15 are threadingly connected in a fully engaged position (see FIG. 1).

The primary advantage of the present invention is that it allows pin members and coupling members to be manufactured while knowing that the pin members and coupling members will be circumferentially aligned (relative to the alignment marks) when installed in the fully engaged position. One result of this advantage is that the orientation of a down-hole pipe in a pipe string can be determined by observing the orientation of a pipe at a surface location of an oil well. This is useful in drilling operations where it is necessary to know the orientation of a down-hole tool. In offshore drilling applications, it is often necessary to know the orientation of a sub-sea valve. If the valve is connected to a pipe string assembled according to the current invention, the orientation of the sub-sea valve can be easily determined.

Another advantage of the method is that it allows installation of equipment to the exterior surface of the pipe string when the alignment of the equipment is critical. A typical example of this is when a fluid-carrying tubing system is attached to the pipe string. Typically, the tubing will be attached to each pipe in the pipe string prior to the assembly of the pipes. As the pipes that comprise the pipe string are assembled, it is essential that the pre-attached tubing on each section of pipe align with the tubing on the other pipes. If the method according to the current invention is used, it possible to know how each pipe in the pipe string will be oriented relative to the other pipes. This allows the tubing to be accurately attached prior to assembly of the pipe string.

It should be apparent from the foregoing that an invention having significant advantages has been provided. While the invention is shown in only one of its forms, it is not just limited but is susceptible to various changes and modifications without departing from the spirit thereof.

We claim:

1. A method of determining the orientation of a first pipe in a pipe string having a series of joints, the pipe string being inserted into a well bore, each joint having a pin member threadingly connected to a coupling member, the pin member and the coupling member being placed in a fully engaged position when installed in the pipe string, the method comprising:

positioning a pin alignment mark on each pin member;

positioning a coupling alignment mark on each coupling member;

machining a plurality of threads on each pin member and each coupling member to a calculated depth so that the pin alignment mark is circumferentially aligned with the coupling alignment mark when the pin member and the coupling member are in the fully engaged position;

observing the orientation of a second pipe in the pipe string to determine a circumferential position of the first pipe; and wherein the machining step further comprises:

preparing a pin marking gage having a pin gage alignment mark and a coupling marking gage having a coupling gage alignment mark, the gages adapted to threadingly engage each other in a first contact position whereby the pin gage alignment mark is circumferentially offset a predetermined distance from the coupling gage alignment mark;

machining a plurality of threads to an initial pin depth onto an exterior annular surface of the pin member;

threadingly connecting the coupling marking gage to the pin member until the gage and the pin member are in the first contact position;

altering the initial pin depth of the threads of the pin member based on the circumferential offset between the pin alignment mark and the coupling gage alignment mark;

machining a plurality of threads onto an interior annular surface of the coupling member, thereby defining a shoulder stop at an initial coupling depth;

threadingly connecting the pin marking gage to the coupling member until the gage and the coupling member are in the first contact position; and altering the initial coupling depth of the shoulder stop based on the circumferential offset between the coupling alignment mark and the pin gage alignment mark.

2. The method according to claim 1 wherein the step of observing the orientation of a second pipe in the pipe string comprises observing the pin alignment mark or the coupling alignment mark.

3. The method according to claim 1 wherein all machining processes are computer controlled.

4. The method according to claim 2 further comprising:

positioning the pin member so that the pin alignment mark is circumferentially aligned with a reference alignment mark during all machining operations; and positioning the coupling member so that the coupling alignment mark is circumferentially aligned with a reference alignment mark during all machining operations.

5. A method of determining the orientation of a first pipe in a pipe string having a series of joints, the pipe string being inserted into a well bore, each joint having a pin member threadingly connected to a coupling member, the pin member and the coupling member being placed in a filly engaged position when installed in the pipe string, the method comprising:

positioning a pin alignment mark on each pin member;

positioning a coupling alignment mark on each coupling member;

machining a plurality of threads on each pin member and each coupling member to a calculated depth so that the pin alignment mark is circumferentially aligned with the coupling alignment mark when the pin member and the coupling member are in the filly engaged position;

observing the orientation of a second pipe in the pipe string to determine a circumferential position of the first pipe; and wherein the machining step further comprises:

preparing a pin marking gage having a pin gage alignment mark and a coupling marking gage having a coupling gage alignment mark, the gages adapted to threadingly engage each other in a first contact position whereby the pin gage alignment mark is circumferentially offset a predetermined distance from the coupling gage alignment mark;

machining a plurality of threads to an initial pin depth onto an exterior annular surface of the pin member;

threadingly connecting the coupling marking gage to the pin member until the gage and the pin member are in the first contact position;

matching a front face of the pin member in order to decrease the initial pin depth of the threads, the amount of material removed being based on the circumferential offset between the pin alignment mark and the coupling gage alignment mark;

machining a plurality of threads onto an interior annular surface of the coupling member, thereby defining a shoulder stop at an initial coupling depth;

threadingly connecting the pin marking gage to the coupling member until the gage and the coupling member are in the first contact position; and increasing the initial coupling depth of the shoulder stop based on the circumferential offset between the coupling alignment mark and the pin gage alignment mark.

6. A method of indexing a string of pipe having a plurality of joints, each joint having a pin member having an exterior annular surface and a front face, each joint having a coupling member having an interior annular surface, the pin member and the coupling member being adapted to be threadingly connected in a fully engaged position, the method comprising:

manufacturing a pin marking gage having a pin gage alignment mark and a coupling marking gage having a coupling gage alignment mark, the gages adapted to threadingly engage each other in a first contact position such that the pin gage alignment mark is circumferentially separated a predetermined distance from the coupling gage alignment mark;

positioning a pin alignment mark on the pin member;

machining a plurality of threads to an initial pin depth onto the exterior annular surface of the pin member;

threadingly connecting the coupling marking gage to the pin member until the gage and the pin member are in the first contact position;

altering the initial pin depth of the threads of the pin member based on the circumferential distance between the pin alignment mark and the coupling gage alignment mark;

positioning a coupling alignment mark on the coupling member;

machining a plurality of threads onto the interior annular surface of the coupling member, thereby defining a shoulder stop at an initial coupling depth;

threadingly connecting the pin marking gage to the coupling member until the gage and the coupling member are in the first contact position; and altering the initial coupling depth of the shoulder stop based on the circumferential distance between the coupling alignment mark and the pin gage alignment mark.

7. The method according to claim 6 wherein the step of altering the initial pin depth of the threads of the pin member further comprises machining the front face of the pin member such that the initial depth of the threads is decreased.

8. The method according to claim 6 wherein the step of altering the initial coupling depth of the shoulder stop further comprises increasing the initial coupling depth of the shoulder stop.

9. The method according to claim 6 wherein all machining processes are computer controlled.

10. The method according to claim 6 further comprising:

positioning the pin member so that the pin alignment mark is circumferentially aligned with a reference alignment mark during all machining operations; and positioning the coupling member so that the coupling alignment mark is circumferentially aligned with a reference alignment mark during all machining operations.

11. A method for assembling pipes in a pipe string having a series of joints, each joint having a pin member and a coupling member, the method comprising the steps of:

preparing a pin marking gage and a coupling marking gage, the coupling marking gage adapted to threadingly receive the pin marking gage, the pin marking gage capable of being threadingly rotated into the coupling marking gage until reaching a first contact position;

positioning a pin gage alignment mark on the pin marking gage;

positioning a coupling gage alignment mark on the coupling marking gage such that the mark is circumferentially misaligned a predetermined distance from the pin gage alignment mark when the two gages are in the first contact position;

positioning a reference alignment mark on a threading machine, the threading machine having a front surface and a cutting member with a home position, the cutting member beginning each threading operation in the same radial and circumferential location relative to the reference alignment mark;

positioning a coupling alignment mark on a coupling blank, the coupling blank having a front face and an inner annular surface;

positioning the coupling blank in the threading machine such that the coupling alignment mark is circumferentially aligned with the reference alignment mark;

establishing a face-off distance for the coupling blank, the face-off distance being a distance from the front face of the coupling blank to the front surface of the threading machine;

threading the inner annular surface of the coupling blank to define a shoulder stop at an initial coupling depth, thereby transforming the coupling blank into the coupling member;

threadedly connecting the pin marking gage to the coupling member;

recording a first circumferential offset between the pin gage alignment mark and the coupling alignment mark;

calculating a final coupling depth to which the coupling member must be machined to allow the pin gage alignment mark to align with the coupling alignment mark;

machining the coupling member to obtain the final coupling depth;

positioning a pipe alignment mark on a plain end pipe, the plain end pipe having a front surface and an outer annular surface;

positioning the plain end pipe in the threading machine such that the pipe alignment mark is circumferentially aligned with the reference alignment mark;

establishing a face-off distance for the plain end pipe, the face-off distance being a distance from the front surface of the plain end pipe to the front surface of the threading machine;

threading the outer annular surface of the plain end pipe to an initial pipe depth, thereby transforming the plain end pipe into the pin member;

threadedly connecting the coupling marking gage to the pin member;

recording a second circumferential offset between the coupling gage alignment mark and the pipe alignment mark;

calculating a final pipe depth to which the pin member must be machined to allow the coupling gage alignment mark to align with the pipe alignment mark;

machining the pin member to obtain the final pipe depth; and threadingly connecting the pin member to the coupling member.

12. The method according to claim 11 wherein the threading machine is computer controlled.

13. The method according to claim 11, wherein:

the step of calculating a final coupling depth is based on the recorded first circumferential offset; and the step of calculating a final pipe depth is based on the recorded second circumferential offset.

14. The method according to claim 11, wherein the step of machining the coupling member to obtain the final coupling depth comprises increasing the initial coupling depth of the shoulder stop.

15. The method according to claim 11, wherein the step of machining the pin member to obtain the final pipe depth comprises decreasing the initial pipe depth by machining the front surface of the pin member.

* * * * *